United States Patent [19]

Heizer

[11] Patent Number: 4,553,396
[45] Date of Patent: Nov. 19, 1985

[54] BRINE CONCENTRATOR

[75] Inventor: Ray T. Heizer, Concord, Calif.

[73] Assignee: Water Services of America, Inc., Milwaukee, Wis.

[21] Appl. No.: 606,529

[22] Filed: May 3, 1984

[51] Int. Cl.⁴ ............................................. F01K 17/00
[52] U.S. Cl. ...................................... 60/648; 60/693; 159/4.01
[58] Field of Search .......................... 60/648, 692, 693; 159/4 R, 4 K; 261/136

[56] References Cited

U.S. PATENT DOCUMENTS

| | | | |
|---|---|---|---|
| 2,893,926 | 7/1959 | Worthen et al. | 60/648 X |
| 3,243,359 | 3/1966 | Schmidt | 202/174 |
| 3,363,664 | 1/1968 | Villanueva | 159/4 R |
| 3,820,336 | 6/1974 | Schwarzenbach | 60/693 |
| 4,009,577 | 3/1977 | Allen | 60/692 |

FOREIGN PATENT DOCUMENTS 761737  9/1980  U.S.S.R. ................................ 60/693

OTHER PUBLICATIONS

"Direct Contact, Air Cooled Evaporation", T. E. Fakatselis, Paper No. 16e, Presented at the 1983 Annual Meeting of the American Institute of Chemical Engineers in Washington, D.C., Oct. 30–Nov. 4, 1983.

Primary Examiner—Stephen F. Husar
Attorney, Agent, or Firm—Andrus, Sceales, Starke & Sawall

[57] ABSTRACT

A system for concentration of waste cooling tower blowdown in a steam turbine power plant. The cooling tower blowdown feed is withdrawn from a main power plant condenser and is recirculated through an auxiliary cooling tower and an auxiliary condenser. The auxiliary condenser utilizes waste heat steam drawn from the main condenser as an energy source. Evaporation continuously takes place in the auxiliary cooling tower concentrating the cooling tower blowdown so that it may be withdrawn and sent to a concentrating pond or other slurry handling station for final disposal.

23 Claims, 1 Drawing Figure

BRINE CONCENTRATOR

BACKGROUND OF THE INVENTION

The present invention relates to power plants, and more particularly to a system for concentration of waste cooling tower blowdown in power plants.

Process discharges, particularly cooling tower blowdown, present difficult engineering, economic and environmental problems involving water treatment. Cooling tower blowdown or brine used in condensing steam to run a turbine in a power plant must be concentrated in some manner prior to final disposal. In the past, evaporation ponds have often been selected as a means to concentrate waste streams. However, wide swings in evaporation rates, high initial costs and environmental concerns have in recent years lead to a search for alternative technologies.

One alternative process for waste concentration involves vapor compression distillation. This process for concentrating cooling tower blowdown, however, initially requires high capital equipment costs, and since it utilizes electricity as the main energy source also results in high utility costs. Another alternative waste concentration process employs waste steam withdrawn from the main power plant condenser which is directed to an evaporator. Although equipment and utility costs for this latter process are less than that required for vapor compression distillation, these costs are still relatively high.

SUMMARY OF THE INVENTION

A system for concentration of brine includes means for raising the temperature of the brine, means for evaporating a portion of the brine concentrate, and means for circulating brine between the heating means and evaporating means.

The system is particularly applicable as an independent circulation loop for cooling tower blowdown concentration in a steam power plant having a brine cooled main condenser connected to the steam discharge of a turbine driven by steam produced from a boiler. In this application, the heating means includes a condenser which draws waste steam from the steam discharge of the turbine. The resulting steam condensate from this auxiliary condenser is fed to the steam condensate line from the main condenser which in turn is used as boiler feed water make-up. The evaporation means includes a cooling tower which concentrates the cooling tower blowdown by evaporation to atmosphere. Brine feed for the circulating loop of concentrated cooling tower blowdown is drawn from the brine discharge of the main power plant condenser, and is continuously pumped between the auxiliary condenser and the cooling tower. This recirculation causes a portion of the brine to be continuously evaporated in the auxiliary cooling tower thus concentrating the cooling tower blowdown so that it may be withdrawn to a concentrating pond or other slurry handling station for final disposal.

The brine concentration system of the present invention provides significant capital and operating costs savings over other known processes.

BRIEF DESCRIPTION OF THE DRAWING

The drawing illustrates the best mode presently contemplated of carrying out the invention.

DESCRIPTION OF THE PREFERRED EMBODIMENT

Figure 1:
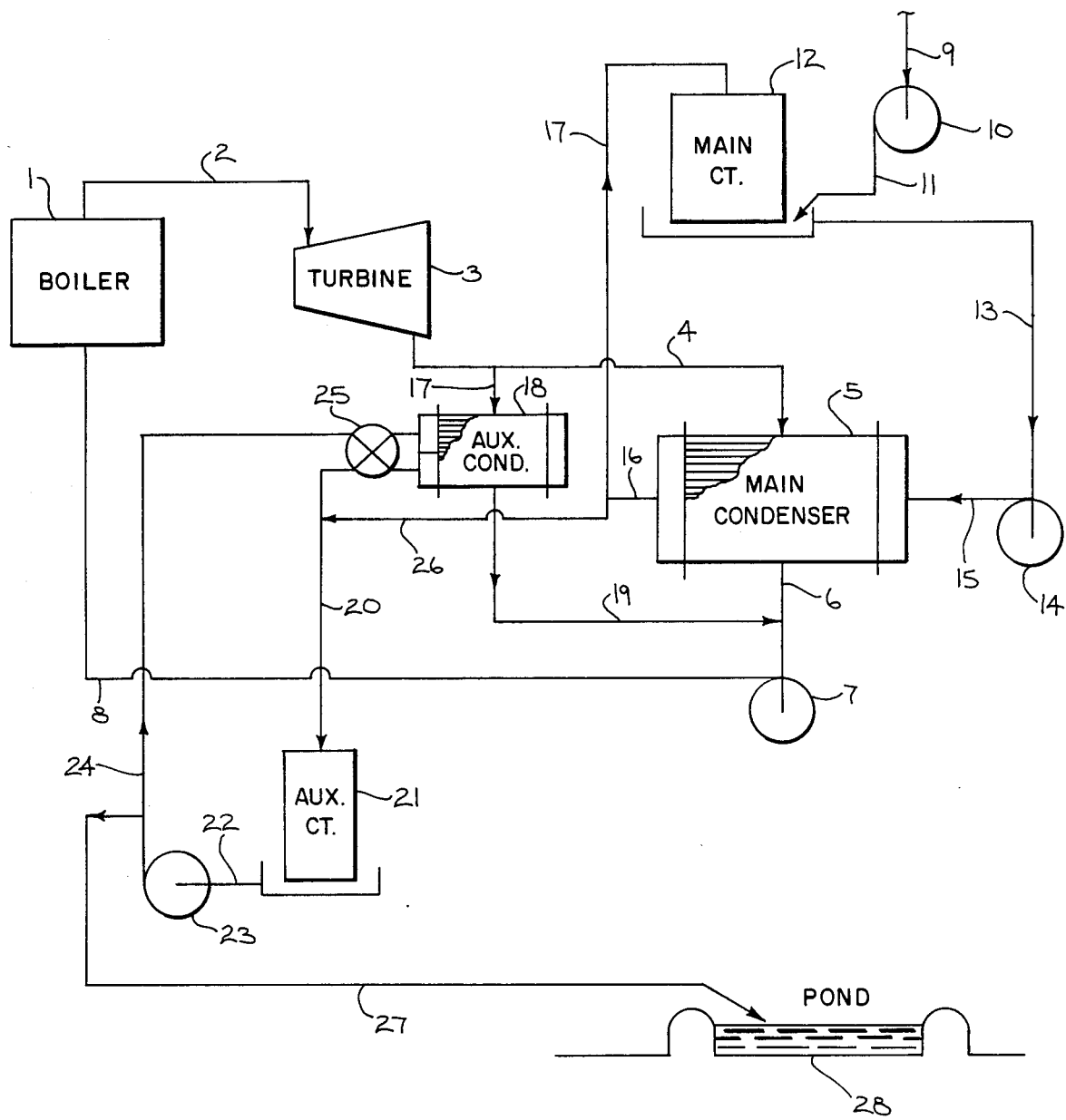
FIG. 1 is a schematic representation of a steam power plant equipped with a circulating loop for concentrating cooling tower blowdown in accordance with the present invention.

Referring now to the drawing, FIG. 1 schematically illustrates a steam power plant provided with a cooling tower blowdown concentration system constructed in accordance with the principles of the present invention. The steam power plant includes a boiler 1 for generating steam which is fed through line 2 to turbine 3 which in turn drives an electrical generator (not shown). Exhaust steam is discharged from turbine 3 through line 4 to one side of heat exchanger 5 which serves as a main condenser for the exhaust steam. Condensate from heat exchanger 5 flows through line 6 to pump 7, and thereafter through line 8 to be recycled as feed water to boiler 1.

Brine is used as the cooling medium in main condenser 5, and is fed to the system through line 9 to pump 10 and then through line 11 to a main cooling tower 12. Brine from cooling tower 12 flows through line 13 to brine recirculating pump 14 and then through line 15 to the inlet of main condenser 5. Brine passes through the other side of condenser 5 to condense steam entering in line 4, and then exits condenser 5 through outlet line 16 and is recirculated to main cooling tower 12 via line 17.

The power plant illustrated in FIG. 1 also includes a waste brine concentration loop which utilizes waste steam drawn from turbine exhaust line 4 as an energy source. Exhaust steam from turbine 3 is drawn from line 4 and flows through line 17 to one side of heat exchanger 18 which serves as an auxiliary condenser for the exhaust steam. Condensate from auxiliary condenser 18 flows through line 19 to condensate line 6 from main condenser 5, and then to pump 7 and through line 8 as feed water to boiler 1.

Auxiliary condenser 18 is used to heat brine which passes therefrom through line 20 to an auxiliary cooling tower 21 where the cooling tower blowdown brine is concentrated by evaporation to atmosphere. Cooling tower blowdown from auxiliary cooling tower 21 flows through line 22 to recirculating pump 23 and then through line 24 to auxiliary condenser 18. A four-way valve 25 controls the flow of cooling tower blowdown to and from auxiliary condenser 18, and is employed to insure condenser 18 does not foul by periodically reversing the flow of cooling tower blowdown through auxiliary condenser 18. Cooling tower blowdown is fed to the concentrating loop through line 26 which is interconnected between lines 16 and 20. Concentrated cooling tower blowdown is withdrawn from the concentrating loop through line 27 which is connected to line 24 on the discharge side of pump 23, and is fed to a pond 28 for further evaporation.

In operation, about 2,966,000 lbs. per hour of steam is produced in boiler 1 with about 234,000 lbs. per hour of steam withdrawn from line 4 through line 17 and fed to auxiliary condenser 18. The remainder of the steam is fed through line 4 to main condenser 5 with the condensate from both condensers 5 and 18 being pumped back to boiler 1 via line 8. About 230,000 gallons per minute of cooling brine at 81° F. is fed via lines 13 and 15 to main condenser 5. Brine exiting main condenser 5 in line 16 is at a temperature of about 108.3° F.

Cooling tower blowdown recirculates in line 24 of the concentrating loop at a rate of about 19,000 gallons per minute at 81° F. Cooling tower blowdown exits auxiliary condenser 18 at a temperature of about 106° F. in line 20. As the cooling tower blowdown passes through auxiliary cooling tower 21 evaporation causes the loss of about 375 gallons per minute, and concentrated cooling tower blowdown is removed in line 27 at a rate of about 111 gallons per minute. Cooling tower blowdown must therefore be fed to the concentrating loop in line 26 at a rate of about 486 gallons per minute. Thus, as cooling tower blowdown circulates between waste steam heated auxiliary condenser 18 and remote auxiliary cooling tower 21 evaporation to atmosphere results in its concentration.

The system has relatively low capital equipment costs as well as relatively low operating and utility costs. Although the drawing illustrates the aspects of the invention as applied to concentrating cooling tower blowdown in a steam power plant, it is contemplated that the same construction could be used in connection with other systems for concentrating brine.

Various modes of carrying out the invention are contemplated as being within the scope of the following claims particularly pointing out and distinctly claiming the subject matter which is regarded as the invention.

I claim:

1. Apparatus for concentrating brine, comprising steam-generating means, steam turbine means receiving steam from said steam-generating means, a main steam condensing loop for the steam including a brine-cooled main heat exchanger means, a main steam feed line to pass steam exhaust from said turbine means to said main heat exchanger means, a main condensate return line to pass condensate from said main heat exchanger means back to said steam-generating means, a brine concentrating loop including auxiliary heat exhanger means having a first side and a second side, an auxiliary cooling tower, first means to pass steam from said main steam feed line to the first side of said auxiliary heat exchanger means, second means to pass condensate from the first side of said auxiliary heat exchanger means to said main condensate return line, third means to pass brine from the second side of said auxiliary heat exchanger means to said auxiliary cooling tower, fourth means to pass brine from said auxiliary cooling tower to the second side of said auxiliary heat exchanger means, fifth means to pass brine from said main steam condensing loop to the second side of said auxiliary heat exchanger means, and sixth means extending from said fourth means to withdraw concentrated brine from said brine concentrating loop.

2. The apparatus of claim 1, wherein said fourth means includes pump means, an inlet line extending from said auxiliary cooling tower to said pump means, and an outlet line extending from said pump means to the second side of said auxiliary heat exchanger means.

3. The apparatus of claim 2, further including valve means for controlling the flow of brine through said third means and said outlet line.

4. The apparatus of claim 1, wherein said main heat exchanger means includes a first side and a second side, said main steam feed line passes exhaust steam to the first side of said main heat exchanger means, and said main condensate return line passes condensate from the first side of said main heat exchanger means to said steam-generating means.

5. The apparatus of claim 4, wherein said main steam condensing loop further includes a main cooling tower, seventh means to pass brine from said main cooling tower to the second side of said main heat exchanger means, and eighth means to pass brine from the second side of said main heat exchanger means to said main cooling tower.

6. The apparatus of claim 5, wherein said fifth means extends between said eighth means and said third means.

7. A steam turbine power plant, comprising a boiler, a steam turbine receiving pressurized steam from said boiler, a main steam condensing loop for the steam including a brine-cooled main condenser having a first side and a second side, a main cooling tower, a main steam feed line to pass steam exhaust from said turbine to the first side of said main condenser, a main condensate return line to pass condensate from the first side of said main condenser back to said boiler, a main brine feed line to pass brine from said main cooling tower to the second side of said main condenser, and a main brine return line to pass brine from the second side of said main condenser back to said main cooling tower, and a brine concentrating loop for the brine including an auxiliary condenser having a first side and a second side, an auxiliary cooling tower, an auxiliary steam feed line to pass steam exhaust from said main steam feed line to the first side of said auxiliary condenser, an auxiliary condensate return line to pass condensate from the first side of said auxiliary condenser to said main condensate return line, a dilute brine line to pass brine from the second side of said auxiliary condenser to said auxiliary cooling tower, a concentrated brine line to pass brine from said auxiliary cooling tower to the second side of said auxiliary condenser, an auxiliary brine feed line to pass brine from said main brine return line to the second side of said auxiliary condenser, and a concentrated brine discharge line extending from said concentrated brine line to withdraw concentrated brine from said concentrating loop.

8. The power plant of claim 7, wherein said auxiliary brine feed line extends from said main brine return line to said dilute brine line.

9. The power plant of claim 7, wherein said main steam condensing loop further includes pump means disposed in said main brine feed line.

10. The power plant of claim 7, wherein said brine concentrating loop further incudes pump means disposed in said concentrated brine line.

11. Apparatus for concentrating a solution, comprising steam-generating means, steam turbine means receiving steam from said steam-generating means, a main steam condensing loop for the steam including a solution-cooled main heat exchanger means, a main steam feed line to pass steam exhaust from said turbine means to said main heat exchanger means, a main condensate return line to pass condensate from said main heat exchanger means back to said steam-generating means, a solution concentrating loop including auxiliary heat exchanger means having a first side and a second side, an auxiliary cooling tower, first means to pass steam from said main steam feed line to the first side of said auxiliary heat exchanger means, second means to pass condensate from the first side of said auxiliary heat exchanger means to said main condensate return line, third means to pass said solution from the second side of said auxiliary heat exchanger means to said auxiliary cooling tower, fourth means to pass said solution from said auxiliary cooling tower to the second side of said auxiliary heat exchanger means, fifth means to pass said solution from said main steam condensing loop to the second side of said auxiliary heat exchanger means, and sixth means extending from said fourth means to withdraw concentrated solution from said solution concentrating loop.

12. The apparatus of claim 11, wherein said fourth means includes pump means, an inlet line extending from said auxiliary cooling tower to said pump means, and an outlet line extending from said pump means to the second side of said auxiliary heat exchanger means.

13. The apparatus of claim 12, further including valve means for controlling the flow of solution through said third means and said outlet line.

14. The apparatus of claim 11, wherein said main heat exchanger means includes a first side and a second side, said main steam feed line passes exhaust steam to the first side of said main heat exchanger means, and said main condensate return line passes condensate from the first side of said main heat exchanger means to said steam-generating means.

15. The apparatus of claim 14, wherein said main steam condensing loop further includes a main cooling tower, seventh means to pass solution from said main cooling tower to the second side of said main heat exchanger means, and eighth means to pass solution from the second side of said main heat exchanger means to said main cooling tower.

16. The apparatus of claim 15, wherein said fifth means extends between said eighth means and said third means.

17. A steam turbine power plant, comprising a boiler, a steam turbine receiving pressurized steam from said boiler, a main steam condensing loop for the steam including a solution-cooled main condenser having a first side and a second side, a main cooling tower, a main steam feed line to pass steam exhaust from said turbine to the first side of said main condenser, a main condensate return line to pass condensate from the first side of said main condenser back to said boiler, a main solution feed line to pass solution from said main cooling tower to the second side of said main condenser, and a main solution return line to pass solution from the second side of said main condenser back to said main cooling tower, and a solution concentrating loop for the solution including an auxiliary condenser having a first side and a second side, an auxiliary cooling tower, an auxiliary steam feed line to pass steam exhaust from said main steam feed line to the first side of said auxiliary condenser, and auxiliary condensate return line to pass condensate from the first side of said auxiliary condenser to said main condensate return line, a dilute solution line to pass solution from the second side of said auxiliary condenser to said auxiliary cooling tower, a concentrated solution line to pass solution from said auxiliary cooling tower to the second side of said auxiliary condenser, an auxiliary solution feed line to pass solution from said main solution return line to the second side of said auxiliary condenser, and a concentrated solution discharge line extending from said concentrated solution line to withdraw concentrated solution from said concentrating loop.

18. The power plant of claim 17, wherein said auxiliary solution feed line extends from said main solution return line to said dilute solution line.

19. The power plant of claim 17, wherein said main steam condensing loop further includes pump means disposed in said main solution feed line.

20. The power plant of claim 17, wherein said solution concentrating loop further includes pump means disposed in said concentrated solution line.

21. Apparatus for concentrating a solution, comprising a steam-generating means, a main steam condensing loop for the steam including a fluid-cooled main condenser having a first side and a second side, a main cooling tower, a main steam feed line to pass steam from said steam-generating means to the first side of said main condenser, a main condensate return line to pass condensate from the first side of said main condenser back to said steam-generating means, a main fluid feed line to pass fluid from said main cooling tower to the second side of said main condenser, and a main fluid return line to pass fluid from the second side of said main condenser back to said main cooling tower, and a solution concentrating loop including an auxiliary condenser having a first side and a second side, an auxiliary cooling tower, an auxiliary steam feed line to pass steam from said main steam feed line to the first side of said auxiliary condenser, an auxiliary condensate return line to pass condensate from the first side of said auxiliary condenser to said main condensate return line, a dilute solution line to pass solution from the second side of said auxiliary condenser to said auxiliary cooling tower, a concentrated solution line to pass solution from said auxiliary cooling tower to the second side of said auxiliary condenser, a solution feed line to feed solution to the second side of said auxiliary condenser, and a concentrated solution discharge line extending from said concentrated solution line to withdraw concentrated solution from said concentrating loop.

22. The apparatus of claim 21, wherein said solution feed line feeds solution to said dilute solution line.

23. The apparatus of claim 21, wherein said fluid comprises said solution, and said solution feed line extends from said main fluid return line to said dilute solution line.

* * * * *